(12) United States Patent
Wong et al.

(10) Patent No.: US 11,159,921 B2
(45) Date of Patent: Oct. 26, 2021

(54) SHORT MESSAGE SERVICE INTERWORKING

(71) Applicant: NOKIA TECHNOLOGIES OY, Espoo (FI)

(72) Inventors: Curt Wong, Bellevue, WA (US); Devaki Chandramouli, Plano, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/476,749

(22) PCT Filed: Jan. 10, 2018

(86) PCT No.: PCT/US2018/013160
§ 371 (c)(1),
(2) Date: Jul. 9, 2019

(87) PCT Pub. No.: WO2018/132468
PCT Pub. Date: Jul. 19, 2018

(65) Prior Publication Data
US 2019/0380011 A1  Dec. 12, 2019

Related U.S. Application Data

(60) Provisional application No. 62/444,617, filed on Jan. 10, 2017.

(51) Int. Cl.
*H04W 4/14* (2009.01)
*H04W 8/04* (2009.01)
(Continued)

(52) U.S. Cl.
CPC ............. *H04W 4/14* (2013.01); *H04W 4/12* (2013.01); *H04W 4/18* (2013.01); *H04W 8/04* (2013.01);
(Continued)

(58) Field of Classification Search
CPC .................................. H04W 4/12; H04W 4/18
See application file for complete search history.

(56) References Cited

U.S. PATENT DOCUMENTS

| 8,463,284 B2 | 6/2013 | Morin et al. |
| 2010/0323727 A1 | 12/2010 | Russell et al. |

(Continued)

FOREIGN PATENT DOCUMENTS

| EP | 2 443 876 A2 | 4/2012 |
| EP | 2 417 786 B1 | 12/2012 |

(Continued)

OTHER PUBLICATIONS

International Search Report and Written Opinion dated Mar. 9, 2018 corresponding to International Patent Application No. PCT/US2018/013160.

(Continued)

*Primary Examiner* — Raj Jain
(74) *Attorney, Agent, or Firm* — Squire Patton Boggs (US) LLP

(57) ABSTRACT

Various communication systems may benefit from suitable interworking. For example, certain fifth generation short message service systems may benefit from interworking with long term evolution short message service deployments in a visited public land mobile network. A method can include receiving, at a network element, an attach request from a user equipment. The method can also include using an internal policy to find a short message service function that resides at the network element. The method can further include using an address of the short message service function for providing short message service to the user equipment.

6 Claims, 12 Drawing Sheets

(51) Int. Cl.
  *H04W 8/06* (2009.01)
  *H04W 4/12* (2009.01)
  *H04W 4/18* (2009.01)
  *H04W 8/28* (2009.01)
  *H04W 60/00* (2009.01)
  *H04W 88/18* (2009.01)

(52) U.S. Cl.
  CPC .............. *H04W 8/06* (2013.01); *H04W 8/28* (2013.01); *H04W 60/00* (2013.01); *H04W 88/184* (2013.01)

(56) References Cited

U.S. PATENT DOCUMENTS

| | | | |
|---|---|---|---|
| 2011/0021216 A1* | 1/2011 | Pudney | H04W 4/12 455/466 |
| 2011/0105117 A1* | 5/2011 | Chin | H04W 4/14 455/435.1 |
| 2014/0155112 A1 | 6/2014 | Molnar et al. | |
| 2015/0024748 A1* | 1/2015 | Zhang | H04W 8/04 455/435.1 |
| 2015/0030019 A1 | 1/2015 | Chandramouli et al. | |
| 2016/0330610 A1* | 11/2016 | Bindrim | H04L 63/104 |
| 2017/0171256 A1* | 6/2017 | Liang | H04W 36/0055 |
| 2019/0357129 A1* | 11/2019 | Park | H04W 60/00 |
| 2019/0380011 A1* | 12/2019 | Wong | H04W 8/28 |

FOREIGN PATENT DOCUMENTS

| | | |
|---|---|---|
| EP | 2 568 728 A2 | 3/2013 |
| EP | 2 871 874 A1 | 5/2015 |

OTHER PUBLICATIONS

Extended European Search Report dated Jun. 19, 2020 corresponding to European Patent Application No. 18738910.1.

3GPP TS 23.272 V13.4.0 (Jun. 2016) Technical Specification, 3rd Generation Partnership Project; Technical Specificaiton Group Services and System Aspects; Circuit Switched (CS) fallback in Evolved Packet System (EPS); Stage 2 (Release 13), Jun. 20, 2016, XP051168851.

Indian Office Action issued in corresponding Indian Patent Application No. 201917027474 dated Jan. 5, 2021.

* cited by examiner

SHORT MESSAGE SERVICE INTERWORKING

CROSS-REFERENCE TO RELATED APPLICATION

This application is related to and claims the benefit and priority of U.S. Provisional Patent Application No. 62/444,617, filed Jan. 10, 2017, the entirety of which is hereby incorporated herein by reference.

BACKGROUND

Field

Various communication systems may benefit from suitable interworking. For example, certain fifth generation short message service systems may benefit from interworking with long term evolution short message service deployments in a visited public land mobile network.

Description of the Related Art

Fifth generation (5G) is a new generation of radio systems and network architecture delivering extreme broadband, as well as ultra-robust, low latency connectivity and massive machine-to-machine connectivity for the Internet of Things (IoT) to enable the programmable world.

5G may, for example, aim to provide massive broadband that delivers gigabytes of bandwidth in uplink and downlink per second on demand. 5G may also provide critical machine-type communication that allows for the immediate, or with extreme low end to end (e2e) latency, synchronous eye-hand feedback that permits remote control of robots and cars. Furthermore, 5G may also provide massive machine-type communication that connects billions of sensors and machines.

The biggest difference between 4G and 5G design requirements may be the diversity of use-cases that 5G networks may need to support as compared to 4G networks. 4G networks were primarily designed for the single use-case of delivering high speed mobile broadband.

5G may not only be a new radio access technology (RAT) family. The 5G architecture may expand to multiple dimensions by providing a common core for multiple radio technologies (for example, cellular, Wi-Fi, and fixed), multiple service (for example, IoT, mobile broadband, low latency-high reliability) and multiple network and service operators.

FIG. 1 illustrates an example of a short message service (SMS) function in a fifth generation core network. The 5G core network may provide SMS over non-access stratum (NAS) to a user equipment (UE). In FIG. 1, the "SMS Function", regardless of it being implemented by the mobility management entity (MME) or mobile switching center (MSC) server may need to provide relay protocol (RP) layer and control protocol (CP) layer protocol and also other adjunct functionality like charging data record (CDR) and lawful intercept (LI), among others. For 5G, AMF may need to interact with some kind of "SMS Function" in order to provide SMS service to UE.

SUMMARY

According to a first embodiment, a method can include receiving, at a network element, an attach request from a user equipment. The method can also include using an internal policy to find a short message service function that resides at the network element. The method can further include using an address of the short message service function for providing short message service to the user equipment.

In a variant, the network element can be a mobile switching center.

In a variant, the address of the short message service function is used instead of an address of a home short message service function of the user equipment.

According to a second embodiment, a method can include receiving, at a home location register, a location update that includes an address. The method can also include determining whether the location update corresponds to a first domain or a second domain. The method can further include separately handling the location update based on whether the location update corresponds to the first domain or the second domain.

In a variant, the first domain can correspond to a short message service function.

In a variant, the second domain can correspond to a 2/3G/LTE MSC.

In a variant, separately handling can include sending a cancel location with respect to the address only when a new location update is received for a same domain as the address.

In a variant, the determining can include comparing the address to a previously configured short message service function address.

According to third and fourth embodiments, an apparatus can include means for performing the method according to the first and second embodiments respectively, in any of their variants.

According to fifth and sixth embodiments, an apparatus can include at least one processor and at least one memory including computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to eleventh and twelfth embodiments, a system may include at least one apparatus according to the third or fifth embodiments in communication with at least one apparatus according to the fourth or sixth embodiments, respectively in any of their variants.

BRIEF DESCRIPTION OF THE DRAWINGS

For proper understanding of the invention, reference should be made to the accompanying drawings, wherein.

DETAILED DESCRIPTION

Figure 1:
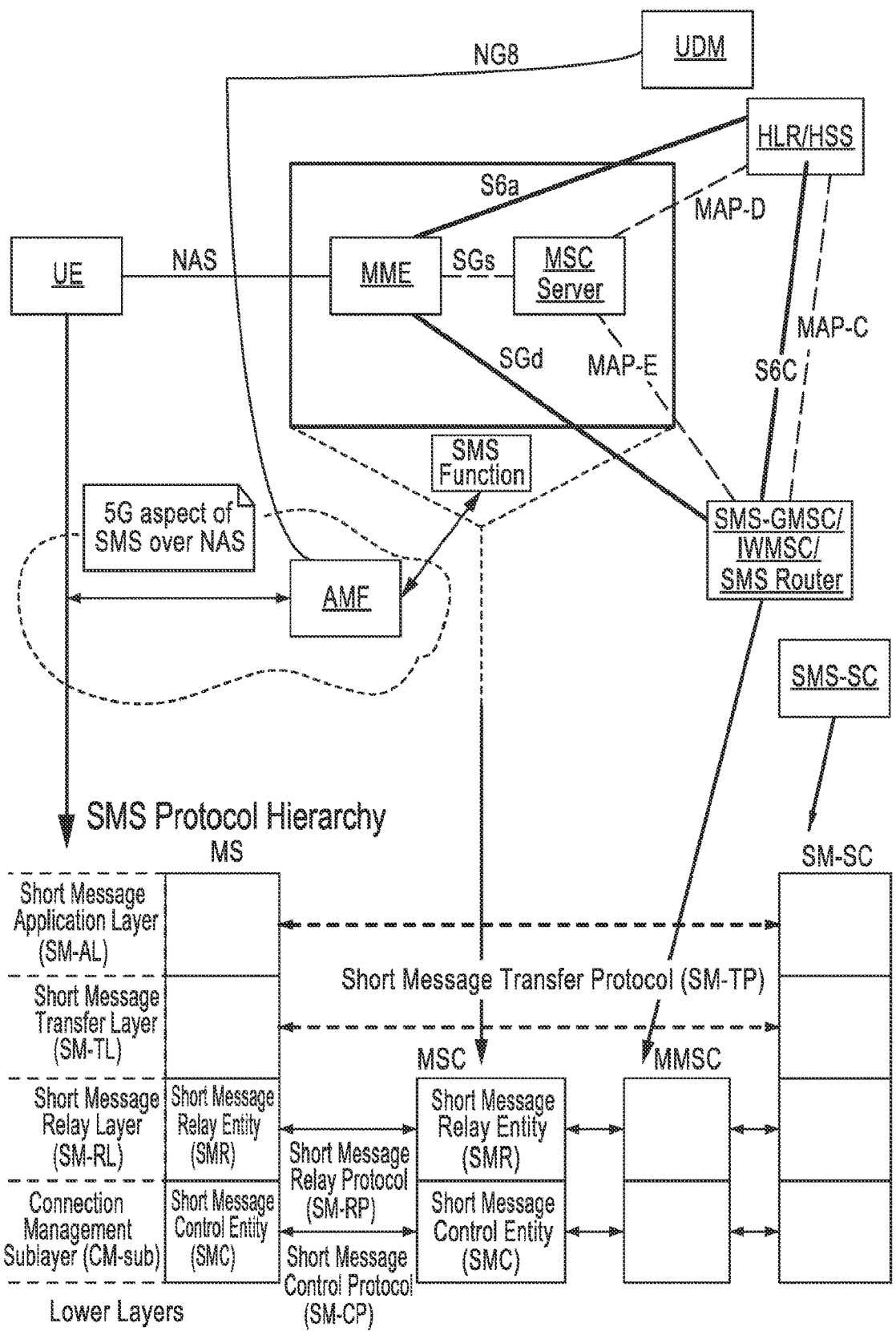
FIG. 1 illustrates an example of a short message service function in a fifth generation core network.
Figure 2:
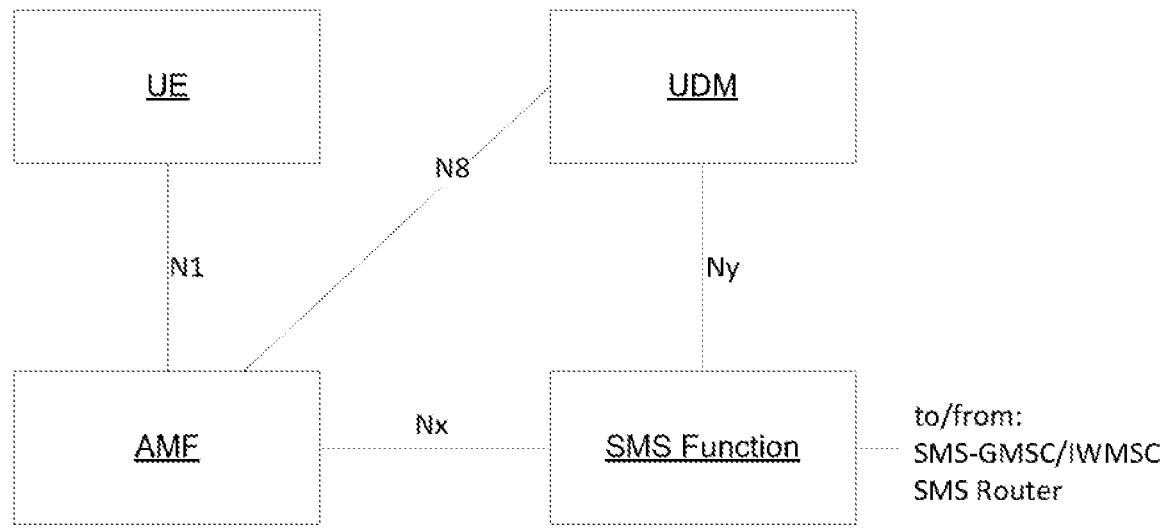
FIG. 2 illustrates a general representation of short message service architecture in fifth generation core network without reliance on circuit switched identities.

FIG. 2 illustrates a short message service architecture without reliance on circuit switched identities. Thus, FIG. 2 provides an architecture for SMS without any dependency on circuit switched (CS) identities such as temporary mobile subscriber identity (TMSI) or local area identity (LAI). Rather the illustrated approach can use a temporary identifier (ID) allocated by an access management function (AMF) to contain a pointer to the SMS function in order to enable selection of SMS function.

During initial registration, UE can include a request for SMS service. Based on the UE's request, the AMF can assign an SMS function and can ensure that the UE has a subscription to obtain an SMS service. Subscription check for SMS for the given UE can be performed either by the AMF or by a service management function (SMF). As part of response to initial registration, the AMF can assign a temporary ID-1 for the UE for subscriber confidentiality and this includes also AMF identifier (if it wishes to remain its serving function until it receives the next request for a given UE). Along with the temporary ID-1, AMF either encodes the pointer to SMS function with temporary ID-1 or creates another temporary ID-2 to point to the SMS function.

When the UE sends a subsequent non-access stratum (NAS) message to the AMF, the UE can include the allocated temporary identifiers. Based on the AMF identifier within the temporary ID-1, the radio access network (RAN) can route the message to the appropriate AMF. Similarly, either based on SMS function within temporary ID-1 or temporary ID-2, the AMF can determine the SMS function for the given UE.

As an alternative to encoding SMS Function ID within the temporary ID assigned to the UE, AMF and SMS function can have independent identifiers over Nx to identify each other—AMF can keep track of an SMS Function ID and SMS function can keep track of an AMF ID. When a new AMF is selected for a given UE, the old AMF can provide the SMS function ID as part of the context request procedure.

When the UE needs to send an SMS to the network, the UE can encapsulate the SMS within the NAS transport message. This NAS transport message can be routed to the SMS function which can eventually route the SMS to the SMS center (SMSC).

When the SMS function needs to send an SMS to the UE, the SMSC can forwards the SMS via the SMS function/ AMF, which can eventually encapsulate the SMS within the NAS transport message. The encapsulated SMS message can be routed to the UE.

Figure 3:
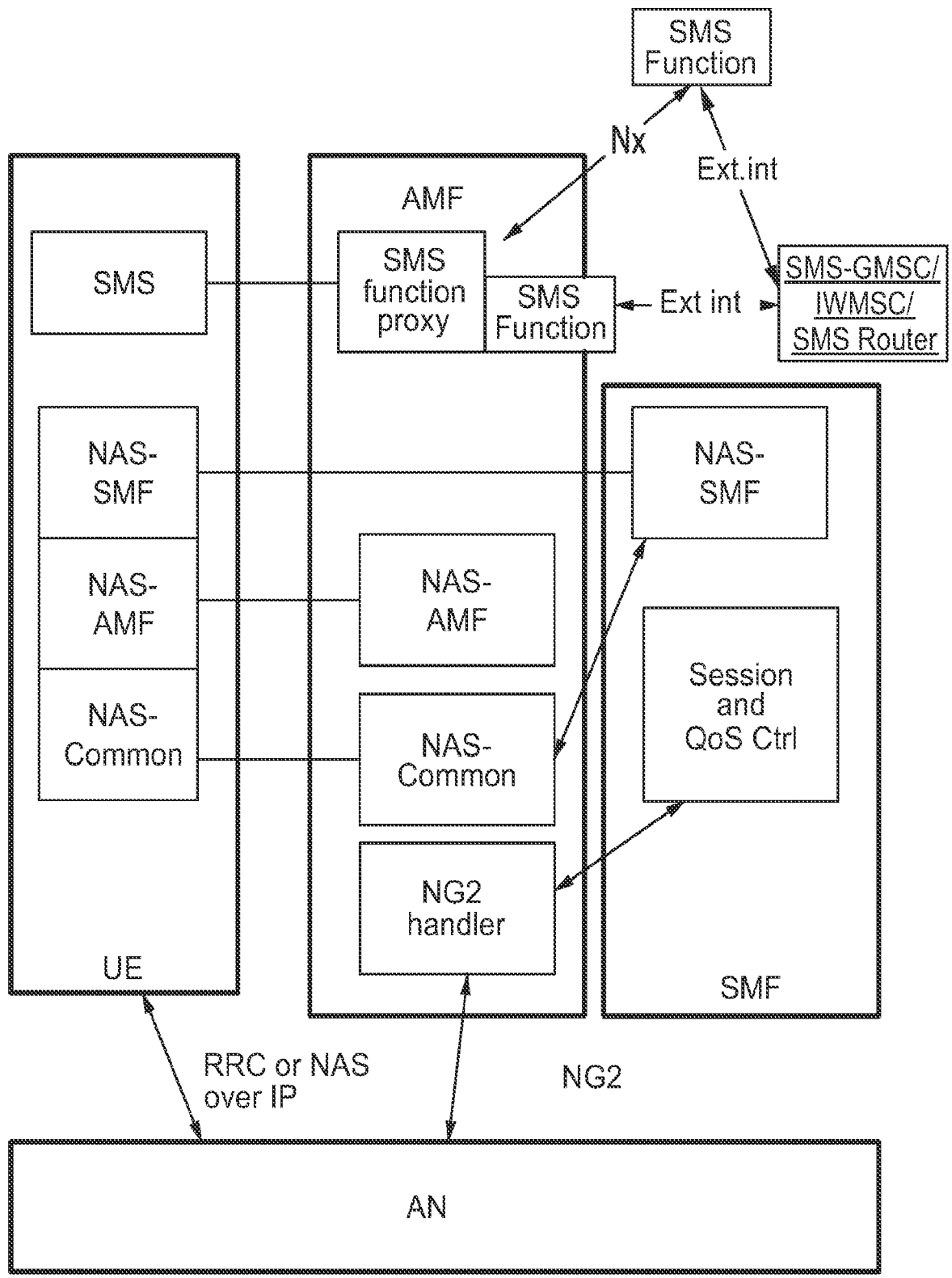
FIG. 3 illustrates an SMS function proxy for SMS function selection.

FIG. 3 illustrates an SMS function proxy for SMS function selection. One way to realize the above principle is that the AMF can contain an SMS function proxy as shown in FIG. 3. This SMS function proxy can be used to analyze the temporary ID-1 (or ID-2) to route to the proper SMS function. In the FIG. 3, a temporary ID (A) may point to an internal SMS function that has an external interface (e.g., SGd) toward IWMSC/SMS-GMSC/SMS Router, and another temporary ID (B) may point to an external SMS function via Nx.

SMS over NAS may be required for 5G. NAS can include a set of protocols used to convey non-radio signaling between the user equipment and the core network (CN). In LTE, SMS over NAS can be supported either by SGs interface with an MSC server, or with an "SMS in MME" option, as described at 3GPP TS 23.272. In the roaming scenario, a visited public land mobile network (VPLMN) may have to have an access to a local MSC server or implement the "SMS in MME option" in order to support SMS over NAS feature.

Figure 4:
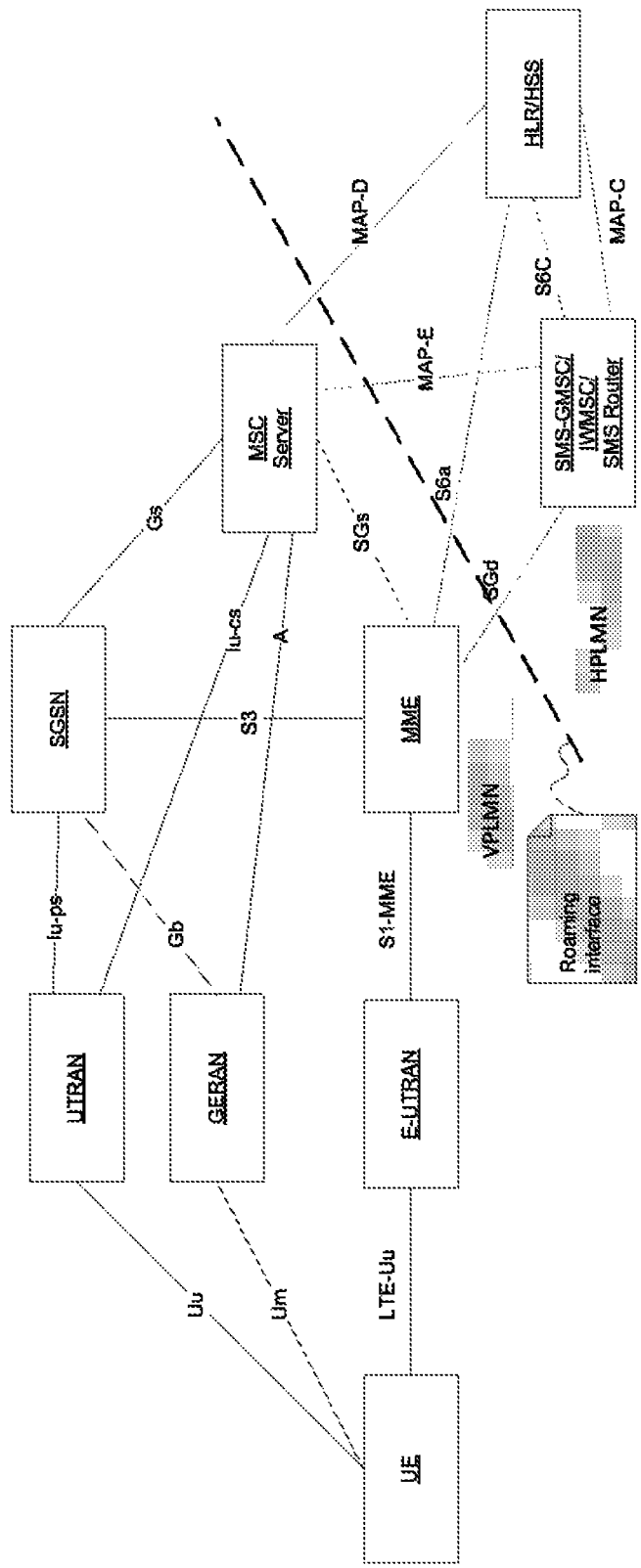
FIG. 4 illustrates SMS over NAS architecture used for 2/3G and LTE access.

FIG. 4 illustrates SMS over NAS architecture used for 2/3G and LTE access. In FIG. 4, the interfaces MAP-D, MAP-E, and SGs can represent the interfaces needed for "SMS over SGs", while the interfaces SGd, S6a and S6C can represent the interfaces needed for an "SMS in MME" option.

5G architecture may be built with a common core for multiple radio technologies, such as cellular, Wi-Fi, and fixed, and this common core may allow different type of green field operators to offer 5G services. In a roaming case, the HPLMN may not require that these green field operators can access a local MSC server for providing SMS for their roaming user. In other words, the HPLMN may not rely on VPLMN capabilities and service offering in order to offer SMS to their users.

The 5G core network may be capable of providing SMS over NAS to a UE with home routed model. However, certain embodiments can take into account other possible SMS deployment options in the VPLMN and can resolve some interaction with a home routed model for SMS.

Figure 5:
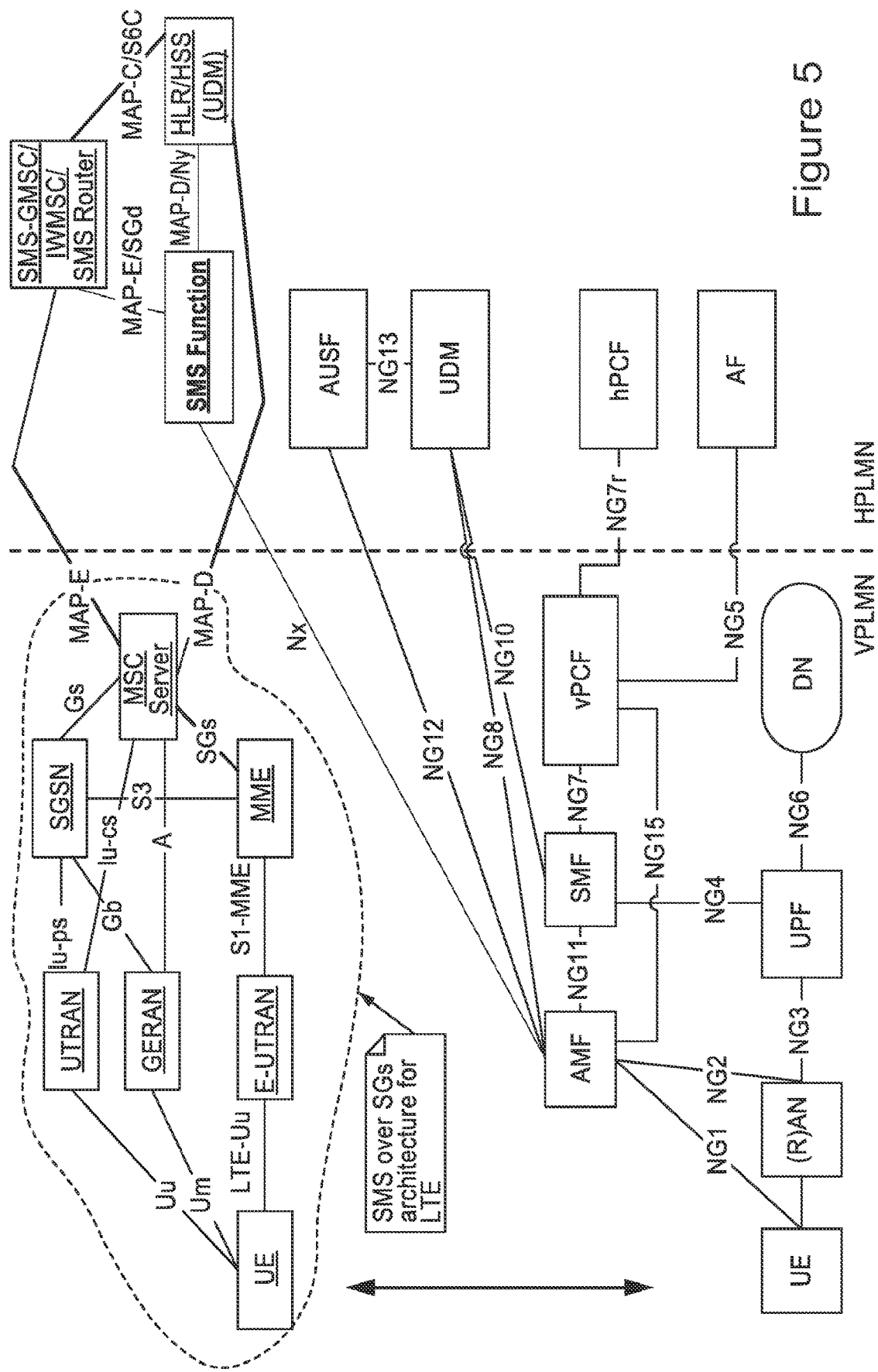
FIG. 5 illustrates a typical VPLMN deployment with 5G and LTE for SMS.
Figure 6:
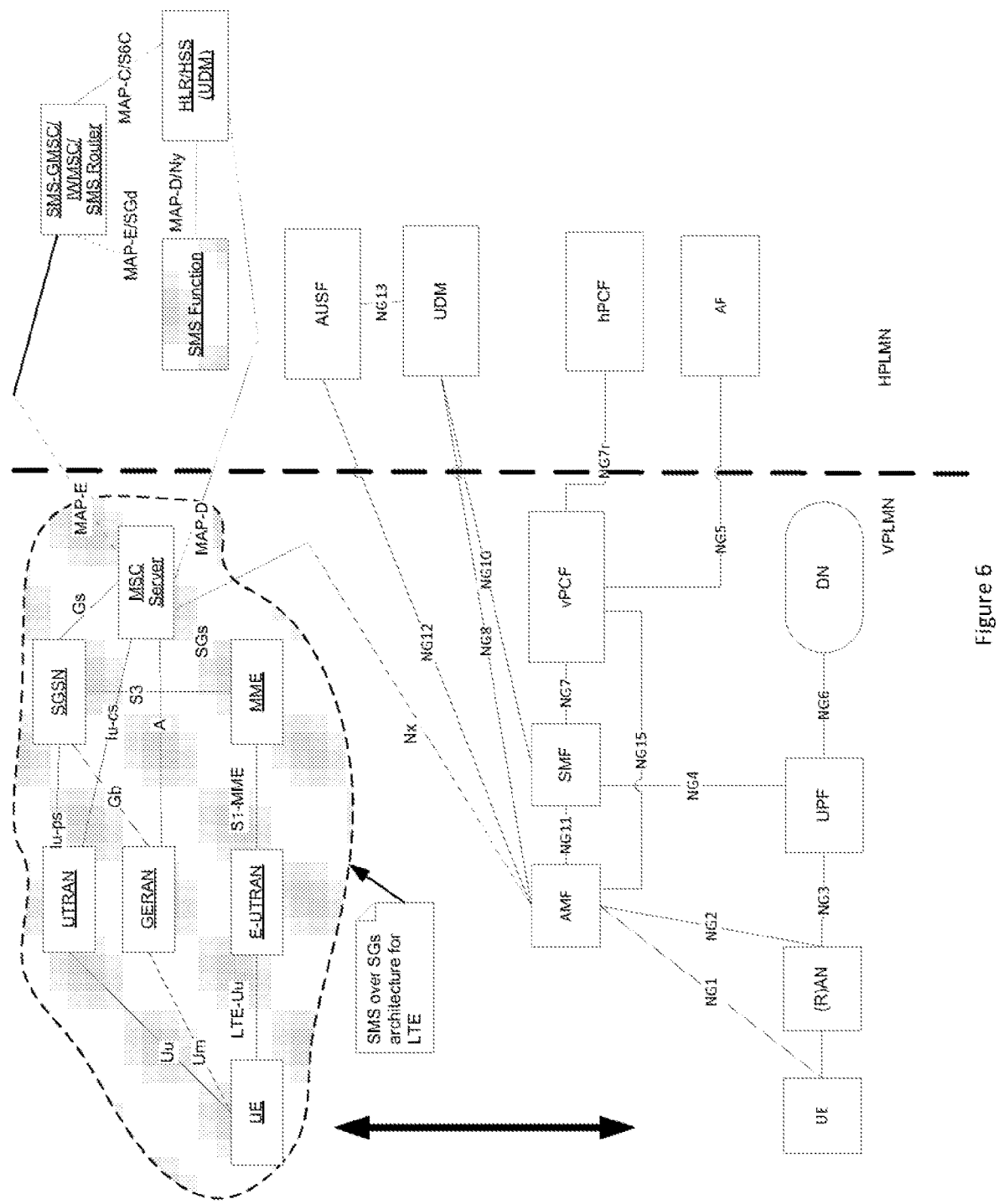
FIG. 6 illustrates an option involving a local SMS function, according to certain embodiments.

FIG. 5 illustrates a typical VPLMN deployment with 5G and LTE for SMS. In FIG. 5, there is a VPLMN with both 5G and LTE from the same PLMN. One issue is that each time the UE moves back and forth between 5G and LTE, the MSC Sever at the VPLMN may perform a location update procedure to the HLR in the HPLMN via the MAP-D interface. This may create an excessive signaling load over MAP-D interface FIG. 6 illustrates an option involving a local SMS function, according to certain embodiments. According to one option, labelled Option A for convenience only and not for limitation, a VPLMN may be allowed to establish Nx to a local SMS function, which may be the same one that is used for SGs to MME. In other words, a visited AMF can avoid using a home routed method, but instead a local Nx connection can be used towards the SMS function.

FIG. 6 thus illustrates a 5G architecture with a local Nx for supporting SMS over NAS in roaming scenario. With this approach, the VPLMN AMF can take into account the policy that the MME is using for selecting the SMS function. This includes the possibility for multiple CS domains for selection.

In this option, during a UE Attach procedure to 5G, the AMF may not use the "SMS Function" address given from the UDM, but instead may use an internal policy to find the "SMS Function" that resides at the same MSC which is used for 2/3/LTE. The AMF may need to allocate an LAI that would allow the target-MME to select the same MSC server for SGs association.

On the UE side, the CS identities including LAI and TMSI received from 2/3/LTE can be retained and passed to 5G and vice versa. This passing may allow the AMF to use the TMSI based NRI as provided by the UE or the same IMSI hash function to retrieve the "SMS Function" that is corresponding to the VLR number used at the MME side. Basically, the AMF can support the same SMS function selection process, as described below for MME, in SMS over SGs in order to ensure the same MSC/VLR is selected when UE goes back and forth between LTE and 5G.

Overall, the UE can be configured to carry the LAI and TMSI received from 5G to LTE and vice versa. Similar VLR configuration data can be carried between the MME and AMF.

Another alternative, designed option B for convenience only and not for limitation, is to avoid having the HLR send a Map CANCEL Location to the VPLMN MSC when the UE moves back and forth. This may ensure that seamless interworking between 5GS and EPS can be achieved by differentiating them appropriately within the UE and network.

This approach can rely on the following principles. The HLR/HSS/UDM can keep the location update procedure separate. For example, the location update procedure from an SMS function can be differentiated from the one performed by a 2/3G/LTE MSC. The location update procedure from one domain can be prevented from affect the other domain. Within each domain, the HLR/HSS/UDM can follow the existing procedure handling cancel location. Thus, for example, HLR/HSS can send a Cancel Location to the OLD MSC when a location update with a new MSC address is received but not when a location update from SMS function for 5G core is received.

Another principle is that the UE can carry the CS domain identities, such as LAC/TMSI, from 2/3/LTE and can use them only during access to 2/3/LTE. In other words, these CS domain identities may not be used or modified in the 5G side.

A further principle is that on 5G, the UE may receive identities from the SMS function via 5G NAS. This information from the SMS function can be used to correlate the same SMS function in the HPLMN when the UE moves from one 5G area to another 5G area, or different AMF are used. Identities from the SMS Function via 5G NAS (if received) may not be used or modified in the 2/3/LTE access.

An additional principle is that when SMS-GMSC retrieves the node address for SMS delivery, the HLR/HSS/UDM can return both the current registered MSC address for 2G/3G/LTE and the SMS function address for 5G. This means the HLR/HSS/UDM can return two nodes for SMS delivery, for over 5G and 2/3/LTE.

The HLR/HSS/UDM may return the node address(es) in any order of sequence. For example, the HLR/HSS/UDM can provide the VPLMN MSC number as a network node number and HPLMN MSC number as additional network node number or the other way around. The node address may or may not be significant to the SMS-GMSC, as the SMS-GMSC may make any decision as to where to try first. For example, the SMS-GMSC can select one node for delivery then retry the other node if the first one fails.

Figure 7:
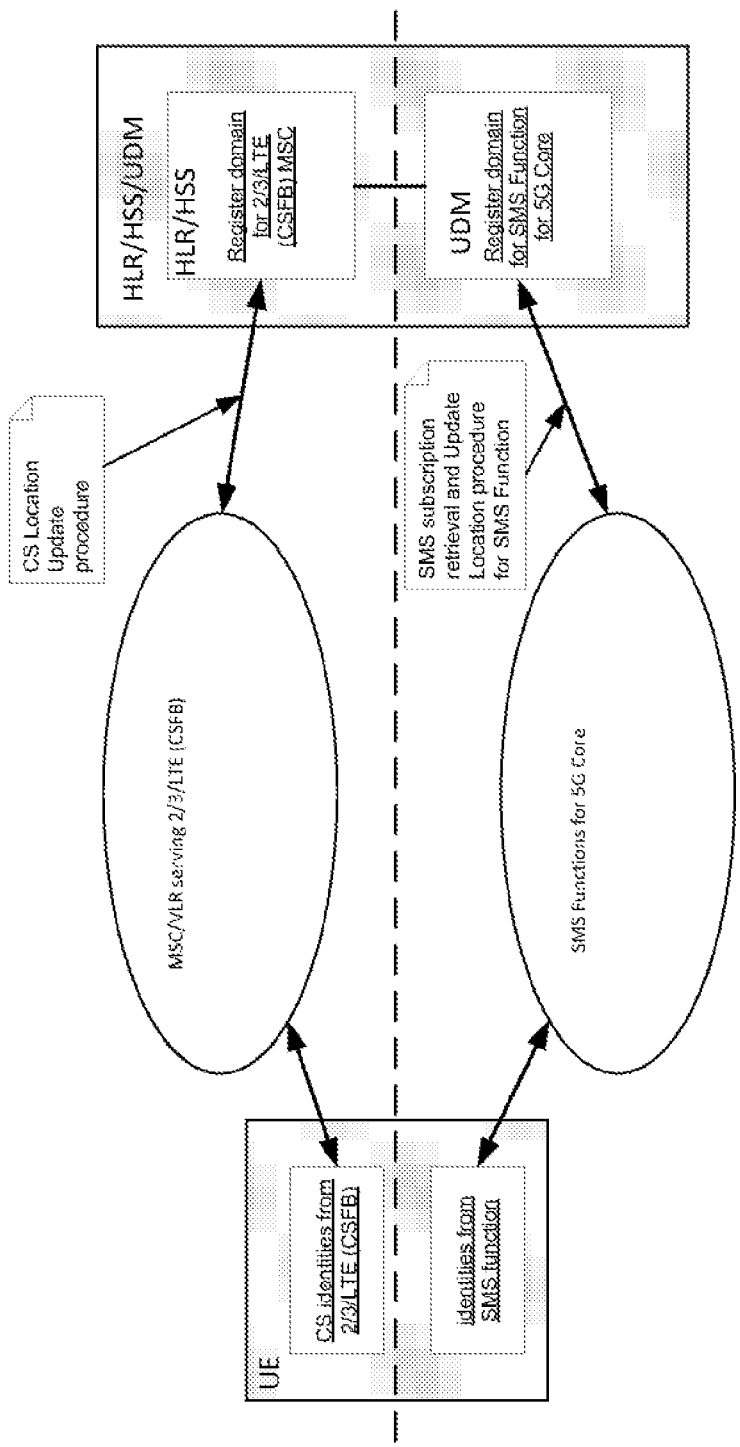
FIG. 7 illustrates circuit switched location update separation into multiple domains, according to certain embodiments.

FIG. 7 illustrates circuit switched (CS) location update and SMS Function for 5G Core separation into multiple domains, according to certain embodiments. More particularly, FIG. 7 illustrates CS location update separation into 5G SMS Function domain and others (2/3/LTE (CSFB)) domain.

The following procedure shows how the HLR/HSS/UDM can separate the SMS related registration into the 2 domains. When the attaches to 5G, the VPLMN AMF can get the HPLMN SMS function address from UDM and the AMF can perform the Nx registration to that SMS function. The SMS function then perform a location update to the HLR/HSS/UDM.

The HLR/HSS/UDM is aware that the address is the SMS function address for SMS delivery via 5G access based on the following: the SMS function address can be configured to the HSS/HLR/UDM; the HLR/HSS/UDM checks the SMS function address when the HLR/HSS/UDM receives location update request and, if matched, the HSS/HLR/UDM marks this update as "5G SMS update"; all SMS function address that has been marked as "5G SMS" can be in one domain; and all SMS function with MSC Server address for 2G/3G/LTE that has not been marked as "5G SMS MSC" can be in the other domain.

Figure 8:
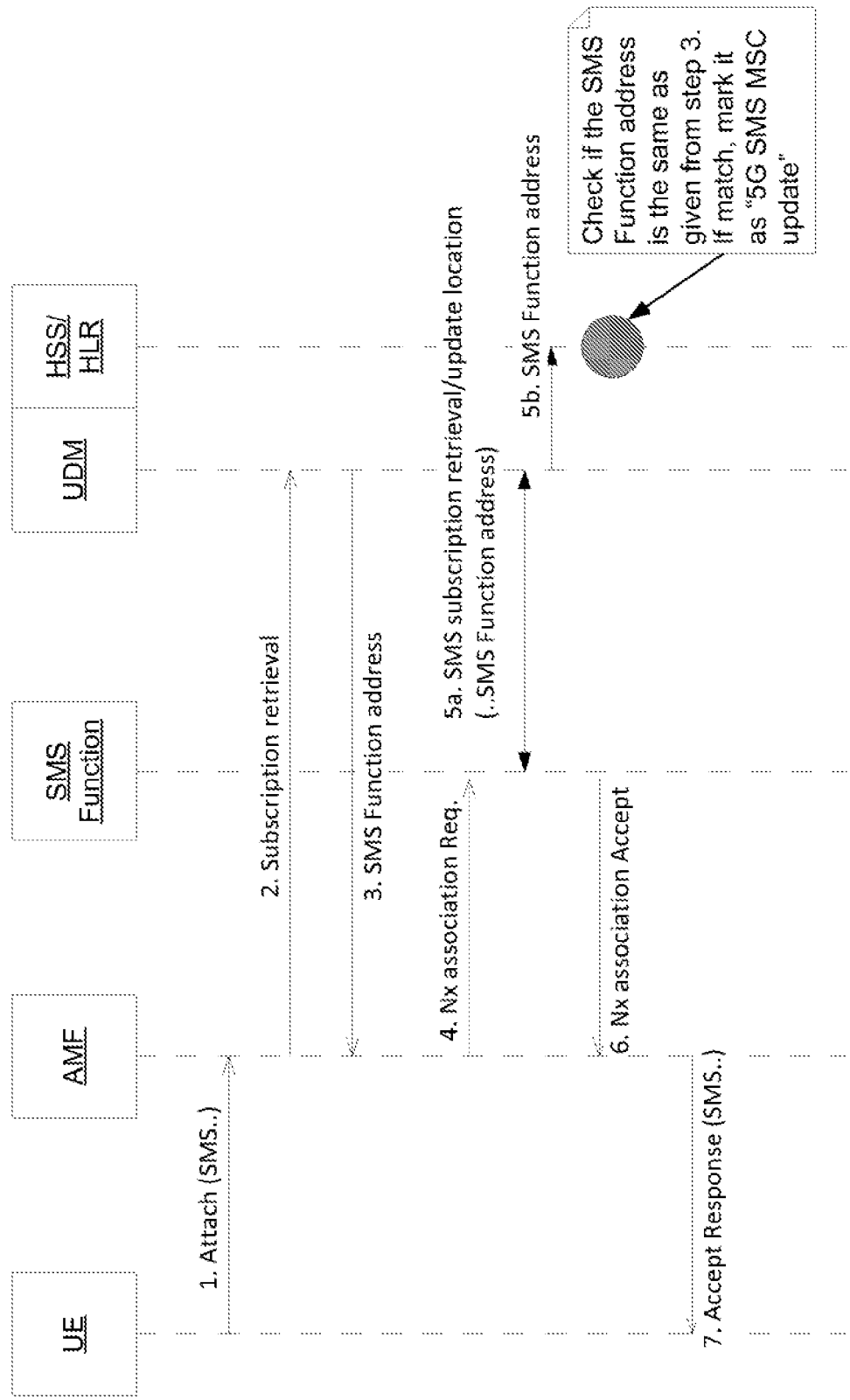
FIG. 8 illustrates a home location register marking an update, according to certain embodiments.

FIG. 8 illustrates a home location register marking an update, according to certain embodiments. More particularly, FIG. 8 illustrates HLR/HSS/UDM marking an SMS Function as "5G SMS update."

The location update from one domain may not cause the HLR/HSS/UDM to send a "cancel location" to the other domain. Now the HSS/HLR/UDM can contain two SMS delivery addresses, and these two addresses can be sent to an SMS-GMSC when being inquired for send routing information (SRI) for short message (SM). As mentioned above, the HLR/HSS/UDM may return the node addresses in any desired sequence, and these can be handled as desired by the SMS-GMSC. See TS 29.002 and TS 23.040 for ways to retrieve multiple network node numbers using MAP and SMS procedures.

Figure 9:
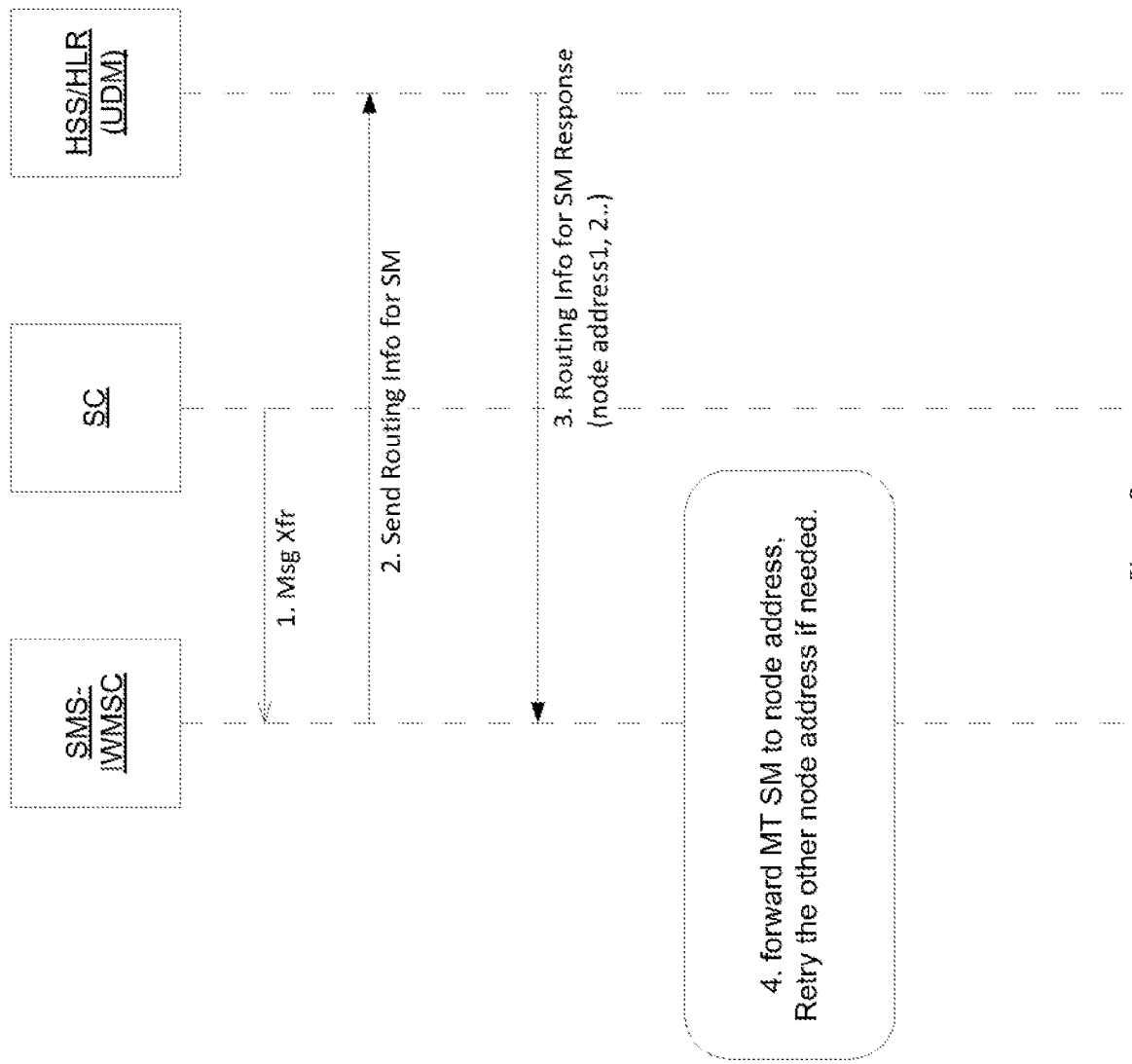
FIG. 9 illustrates mobile terminated SMS delivery, according to certain embodiments.

FIG. 9 illustrates mobile terminated SMS delivery, according to certain embodiments. As shown in FIG. 9, at 1, the SC can provide a message transfer to the SMS-IWMSC. In response, the SMS-IWMC at 2 can issue a sending routing info for short message request to an HSS/HLR. At 3, the SMS-IWMC can receive a routing information for SM response message from the HSS/HLR/UDM. The response can include multiple node addresses. The SMS-IWMSC can forward the mobile terminated short message to a first node address selected from the list. If needed, the SMS-IWMSC can retry to the other node address.

On the UE side, the UE may need to retain the TMSI and LAI that it has received earlier from LTE/2/3G, as well as the SMS function identities received from 5G. In other words, 5G may not overwrite the identities UE received from 2/3/LTE (LAC, TMSI) and vice versa. Thus, the UE can manage these identities independently. This can allow the same MSC or SMS function to be selected when UE switches back and forth between RATs.

Figure 10:
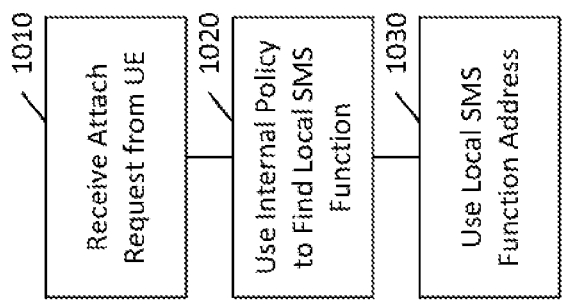
FIG. 10 illustrates a method according to certain embodiments.

FIG. 10 illustrates a method according to certain embodiments. The method of FIG. 10 can, for example, correspond to option A mentioned above. The method can include, at 1010, receiving, at a network element, an attach request from a user equipment. The network element can be a mobile switching center.

The method can also include, at 1020, using an internal policy to find a short message service function that resides at the network element. The method can further include, at 1030, using an address of the short message service function for providing short message service to the user equipment.

For example, the address of the short message service function can be used instead of an address of a home short message service function of the user equipment. Compare, for example the arrangement of FIG. 5 with the arrangement of FIG. 6, in which a local SMS function is used instead of an SMS function in the home network.

Figure 11:
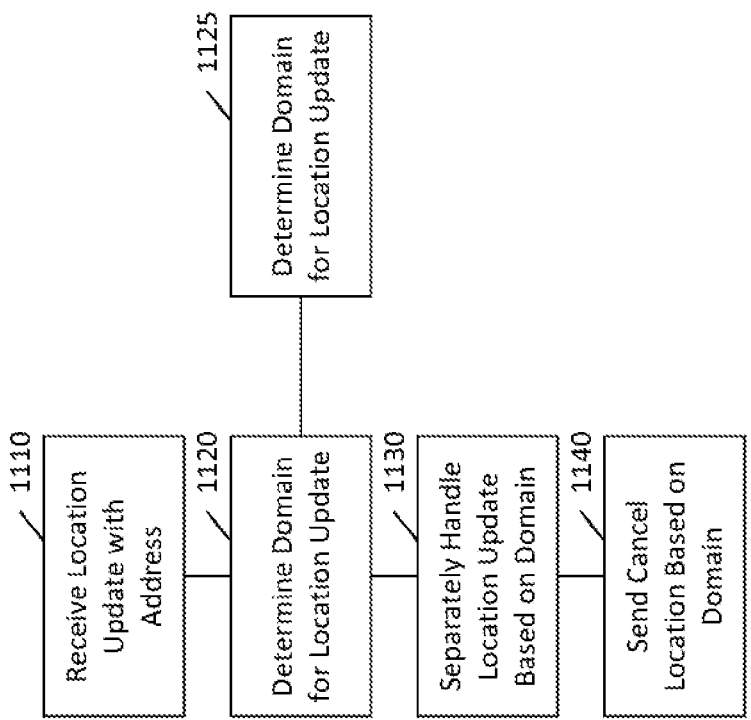
FIG. 11 illustrates a further method according to certain embodiments.

FIG. 11 illustrates a further method according to certain embodiments. The method of FIG. 11 may, for example, correspond to option B discussed above.

The method can include, at 1110, receiving, at a home location register, a location update that includes an address. The method can also include, at 1120, determining whether the location update corresponds to a first domain or a second domain. More than two domains can be used, if desired. The first domain can correspond to a short message service function, whereas the second domain can correspond to a 2/3G/LTE MSC, or vice versa. The determining can include, at 1125, comparing the address to a previously configured short message service function address.

The method can further include, at 1130, separately handling the location update based on whether the location update corresponds to the first domain or the second domain. The separately handling can include, at 1140, sending a cancel location with respect to the address only when a new location update is received for a same domain as the address.

Figure 12:
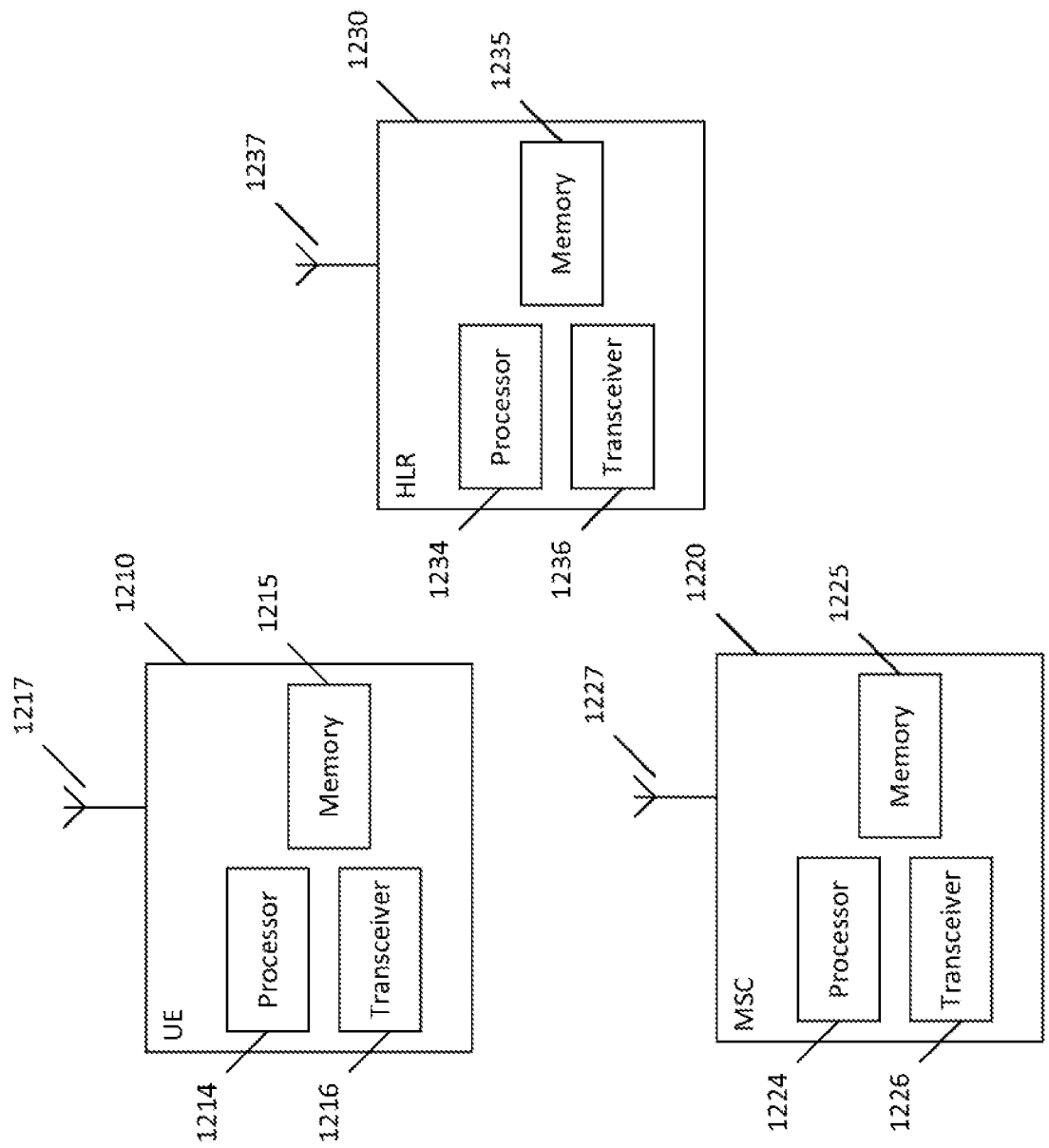
FIG. 12 illustrates a system according to certain embodiments.

FIG. 12 illustrates a system according to certain embodiments of the invention. In one embodiment, a system may include multiple devices, such as, for example, at least one UE 1210, at least one MSC 1220, which may be an SMS-IWMSC, and at least one HLR 1230.

Each of these devices may include at least one processor, respectively indicated as 1214, 1224, and 1234. At least one memory can be provided in each device, and indicated as 1215, 1225, and 1235, respectively. The memory may include computer program instructions or computer code contained therein. The processors 1214, 1224, and 1234 and memories 1215, 1225, and 1235, or a subset thereof, can be configured to provide means corresponding to the various blocks of FIG. 9.

As shown in FIG. 12, transceivers 1216, 1226, and 1236 can be provided, and each device may also include an antenna, respectively illustrated as 1217, 1227, and 1237. Other configurations of these devices, for example, may be provided. For example, HLR 1230 may be configured for wired communication, in addition to wireless communication, and in such a case antenna 1237 can illustrate any form of communication hardware, without requiring a conventional antenna.

Transceivers 1216, 1226, and 1236 can each, independently, be a transmitter, a receiver, or both a transmitter and a receiver, or a unit or device that is configured both for transmission and reception.

Processors 1214, 1224, and 1234 can be embodied by any computational or data processing device, such as a central processing unit (CPU), application specific integrated circuit (ASIC), or comparable device. The processors can be implemented as a single controller, or a plurality of controllers or processors.

Memories 1215, 1225, and 1235 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as UE 1210, MSC 1220, and HLR 1230, to perform any of the processes described herein (see, for example, FIGS. 10 and 11). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 12 illustrates a system including a UE, MSC, and HLR, embodiments of the invention may be applicable to other configurations, and configurations involving additional elements. For example, not shown, additional UEs may be present, and additional core network elements may be present, as illustrated in FIGS. 1 through 9.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   receiving, at a network element, an attach request from a user equipment;
   using an internal policy of the network element to find a short message service function that resides at the network element; and
   using an address of the short message service function for providing short message service to the user equipment.

2. The method of claim 1, wherein the network element is a mobile switching center.

3. The method of claim 1, wherein the address of the short message service function is used instead of an address of a home short message service function of the user equipment.

4. An apparatus, comprising:
   at least one processor; and
   at least one memory including computer program code,
   wherein the at least one memory and the computer program code are configured to, with the at least one processor, cause the apparatus at least to
   receive, at a network element, an attach request from a user equipment;
   use an internal policy of the network element to find a short message service function that resides at the network element; and
   use an address of the short message service function for providing short message service to the user equipment.

5. The apparatus of claim 4, wherein the network element is a mobile switching center.

6. The apparatus of claim 4, wherein the address of the short message service function is used instead of an address of a home short message service function of the user equipment.

* * * * *